(12) United States Patent
Knudsen et al.

(10) Patent No.: US 10,883,475 B2
(45) Date of Patent: Jan. 5, 2021

(54) METHOD FOR MONITORING AND ASSESSING POWER PERFORMANCE CHANGES OF A WIND TURBINE

(71) Applicant: VESTAS WIND SYSTEMS A/S, Aarhus N (DK)

(72) Inventors: Sven Jesper Knudsen, Varde (DK); Carsten Krogh Nielsen, Hammel (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 291 days.

(21) Appl. No.: 15/776,115

(22) PCT Filed: Nov. 9, 2016

(86) PCT No.: PCT/DK2016/050359
§ 371 (c)(1),
(2) Date: May 15, 2018

(87) PCT Pub. No.: WO2017/088877
PCT Pub. Date: Jun. 1, 2017

(65) Prior Publication Data
US 2018/0335019 A1     Nov. 22, 2018

(30) Foreign Application Priority Data
Nov. 26, 2015   (DK) .................................. 2015 70766

(51) Int. Cl.
*F03D 7/04*     (2006.01)
*G06N 20/00*    (2019.01)
(Continued)

(52) U.S. Cl.
CPC ............. *F03D 7/046* (2013.01); *F03D 7/048* (2013.01); *F03D 17/00* (2016.05);
(Continued)

(58) Field of Classification Search
CPC ............ F05B 2260/845; F05B 2260/83; F05B 2270/32; F05B 2270/70; F05B 2270/335;
(Continued)

(56) References Cited

U.S. PATENT DOCUMENTS 8,924,162 B2 * 12/2014 Lapira .................... F03D 17/00
                                                                 702/34
9,551,322 B2 *  1/2017 Ambekar ................ F03D 17/00
(Continued)

FOREIGN PATENT DOCUMENTS

CN      102208050 A    10/2011
EP        2469082 A2    6/2012
(Continued)

OTHER PUBLICATIONS

Chinese Office Action for Application No. 201680068830.5 dated Apr. 4, 2019.
(Continued)

*Primary Examiner* — Mischita L Henson
(74) *Attorney, Agent, or Firm* — Patterson + Sheridan, LLP

(57) ABSTRACT

Monitoring and assessing power performance changes of one or more wind turbines of a wind farm. For each wind turbine to be monitored, a group of reference wind turbines is defined. During a training period a transfer function is generated for each monitored wind turbine. The transfer function establishes a relationship between locally measured wind speeds at each of the reference wind turbines and the power performance data for the monitored wind turbine obtained during the training period. During one or more subsequent test periods, measured power performance data for the monitored wind turbines is compared to predicted power performance data. The predicted power performance data is obtained by means of the locally measured wind
(Continued)

speeds at the corresponding reference wind turbines during the test period(s) and the previously generated transfer function for the monitored wind turbine. This allows even small and/or gradual power performance degradation to be detected.

19 Claims, 3 Drawing Sheets

(51) Int. Cl.
*F03D 17/00* (2016.01)
*G06F 30/20* (2020.01)
*G01R 21/133* (2006.01)
*G06F 111/10* (2020.01)

(52) U.S. Cl.
CPC ......... *G01R 21/1331* (2013.01); *G06F 30/20* (2020.01); *G06N 20/00* (2019.01); *F05B 2260/821* (2013.01); *F05B 2260/83* (2013.01); *F05B 2260/845* (2013.01); *F05B 2270/32* (2013.01); *F05B 2270/335* (2013.01); *F05B 2270/70* (2013.01); *G06F 2111/10* (2020.01); *Y02E 10/72* (2013.01)

(58) Field of Classification Search
CPC .... F05B 2260/821; F03D 17/00; F03D 7/048; F03D 7/046; G06F 2111/10; G06F 30/20; G01R 21/1331; Y02E 10/723; G06N 20/00
See application file for complete search history.

(56) References Cited

U.S. PATENT DOCUMENTS

| | | | | |
|---|---|---|---|---|
| 9,644,612 | B2* | 5/2017 | Evans | H02J 3/386 |
| 2004/0230377 | A1* | 11/2004 | Ghosh | G05B 15/02 |
| | | | | 702/3 |
| 2011/0224926 | A1 | 9/2011 | Morjaria et al. | |
| 2011/0313726 | A1* | 12/2011 | Parthasarathy | G05B 23/024 |
| | | | | 702/179 |
| 2012/0209539 | A1 | 8/2012 | Kim | |
| 2013/0073223 | A1 | 3/2013 | Lapira et al. | |
| 2014/0167416 | A1 | 6/2014 | Perley et al. | |
| 2015/0077155 | A1* | 3/2015 | Clausen | F03D 17/00 |
| | | | | 324/765.01 |
| 2016/0084233 | A1* | 3/2016 | Evans | F03D 9/257 |
| | | | | 73/112.01 |

FOREIGN PATENT DOCUMENTS

| | | |
|---|---|---|
| EP | 2631471 A1 | 8/2013 |
| WO | 2011101475 A2 | 8/2011 |
| WO | 2015077337 A1 | 5/2015 |
| WO | 2017088877 A1 | 6/2017 |

OTHER PUBLICATIONS

Danish Patent and Trademark Office Technical Examination and Search Report for Application No. PA 2015 70766 dated Aug. 18, 2016.
PCT Notificatin of Transmittal of the International Search Report and the Written Opinion of the International Searching Authority, or the Declaration for Application No. PCT/DK2016/050359 dated Jan. 19, 2017.

* cited by examiner

METHOD FOR MONITORING AND ASSESSING POWER PERFORMANCE CHANGES OF A WIND TURBINE

FIELD OF THE INVENTION

The present invention relates to a method for monitoring and assessing power performance changes of one or more wind turbines of a wind farm. In particular, the method of the invention may be used for detecting if the power performance of a wind turbine degrades over time, either gradually or abruptly.

BACKGROUND OF THE INVENTION

Wind turbines are normally provided with a rotor in the form of a rotatable hub carrying a set of wind turbine blades. The wind acts on the wind turbine blades, thereby causing the hub to rotate. The rotational movements of the hub are transferred to a generator, either via a gear arrangement or directly, in the case that the wind turbine is of a so-called direct drive type. In the generator, electrical energy is generated, which may be supplied to a power grid.

Sometimes the power performance of a wind turbine, e.g. in terms of the power produced by the wind turbine, degrades over time. This may, e.g., be due to wear on, malfunction of or breakdown of one or more part of the wind turbine, such as wind turbine blades, gear arrangements, bearings, yaw mechanisms, etc., soiling of the wind turbine blades, etc. In some cases the degradation of the power performance takes place in an abrupt manner, e.g. in the case that the degradation is caused by malfunction or breakdown of a part of the wind turbine. In other cases the degradation of the power performance takes place gradually. This is, e.g., the case when the degradation in power performance is due to soiling of the wind turbine blades.

Examples of events leading to degradation of the power performance of a wind turbine include changes to calibrations of sensors, added extra aerodynamic add-ons on the wind turbine blades, e.g. in the form of vortex generators or gurney flaps, falling off, etc.

If a degradation in power performance of a wind turbine goes undetected, e.g. by the wind turbine control system, the turbine may be operated for a long time at sub-optimal performance. This is, of course, undesirable. However, it is often difficult to detect changes in power performance of a wind turbine, among other things due to natural variations occurring in the available wind data obtained from the wind turbines.

In any event, it is desirable to be able to reliably detect when a degradation of the power performance of a wind turbine occurs, because this will allow the cause of the degradation of the power performance to be quickly at least partly removed, thereby restoring the power performance of the wind turbine.

EP 2 372 479 A1 discloses a method for indicating a performance of a wind turbine. Target performance data is created based at least in part on performance data for one or more wind turbines of interest. Baseline performance data is calculated based at least in part on performance data for a plurality of other wind turbines. The target performance data is compared to the baseline performance data to create a relative performance profile.

DESCRIPTION OF THE INVENTION

It is an object of embodiments of the invention to provide a method for monitoring and assessing power performance changes of one or more wind turbines, the method allowing a degradation in power performance of a wind turbine to be reliably detected.

It is a further object of embodiments of the invention to provide a method for monitoring and assessing power performance changes of one or more wind turbines, the method allowing small, but significant, changes in power performance to be detected.

The invention provides a method for monitoring and assessing power performance changes of one or more wind turbines of a wind farm, the method comprising the steps of:

for each wind turbine to be monitored, defining a group of reference wind turbines, the group of reference wind turbines comprising two or more wind turbines, operating the wind turbines of the wind farm, while obtaining locally measured wind speeds at each of the wind turbines, during a training period, obtaining power performance data for each of the monitored wind turbines, during the training period, for each of the monitored wind turbines, generating a transfer function establishing a relationship between the locally measured wind speeds at each of the reference wind turbines and the power performance data for the monitored wind turbine, based on locally measured wind speeds and power performance data obtained during the training period, operating the wind turbines of the wind farm, while obtaining locally measured wind speeds, at least at the reference wind turbines, during one or more test periods, following the training period, obtaining power performance data for each of the monitored wind turbines, during the test period(s), for each of the monitored wind turbines, comparing the power performance data obtained during the test period(s) to predicted power performance data obtained by means of the locally measured wind speeds at the corresponding reference wind turbines during the test period(s) and the previously generated transfer function for the monitored wind turbine, and assessing power performance changes for each of the monitored wind turbines, based on the comparison.

Thus, the present invention relates to a method for monitoring and assessing power performance changes of one or more wind turbines of a wind farm, regardless of whether such power performance changes take place in an abrupt or in a gradual manner. In the present context the term 'wind farm' should be interpreted to mean a group of wind turbines, arranged within a site, i.e. a well defined geographical area. The wind farm may be arranged on-shore or off-shore. The wind turbines of a wind farm are sometimes at least partly controlled dependently of each other. Wind farms are also sometimes referred to as 'wind power plants' or 'wind parks'.

According to the method of the invention, for each wind turbine to be monitored, a group of reference wind turbines is defined. Each group of reference wind turbines comprises two or more wind turbines of the wind farm. The monitored wind turbines could be any number of wind turbines of the wind farm, including all of the wind turbines of the wind farm. This will be described in further detail below.

When defining the group of reference wind turbines for a given monitored wind turbine, a number of wind turbines of the wind farm, other than the monitored wind turbine, are selected and included in the group of reference wind turbines. This could, e.g., be all of the other wind turbines of the wind farm, or it could be a suitable subset of the wind turbines of the wind farm. For instance, only wind turbines being arranged in the vicinity of the monitored wind turbine may be selected and/or only wind turbines of the same type as the monitored wind turbine. Alternatively or additionally, some of the wind turbines of the wind turbine may be ruled out as reference wind turbines with respect to any of the monitored wind turbines, e.g. because they are known to behave in a manner which is not representative for a typical wind turbine of the wind farm, e.g. due to special conditions occurring at a part of the site where such a wind turbine is arranged, e.g. in terms of terrain, wind wake, turbulence, wind shear, etc., or simply because the wind turbines are of a different type than the other wind turbines of the wind farm.

It is not ruled out that a given wind turbine may form part of the group of reference wind turbines with respect to two or more monitored wind turbines. It is also not ruled out that a monitored wind turbine could form part of the group of reference wind turbines with respect to one or more other monitored wind turbines.

Next, the wind turbines of the wind farm are operated, in a normal manner, while obtaining locally measured wind speeds at each of the wind turbines, during a training period. The locally measured wind speeds may, e.g., be obtained by means of measurement devices, such as anemometers, arranged at or near the wind turbines.

The training period could be a relatively long period of several months or a year, or even longer.

Furthermore, power performance data for each of the monitored wind turbines is obtained, during the training period. The wind speed data and power performance data obtained during the training period is used for establishing a kind of 'baseline', based on which future power performance of the monitored wind turbines can be assessed.

For each of the monitored wind turbines, a transfer function is then generated. The transfer function establishes a relationship between locally measured wind speeds at each of the reference wind turbines and the power performance data for the monitored wind turbine, based on locally measured wind speeds and power performance data obtained during the training period. Thus, the transfer function for a given monitored wind turbine can be used for predicting or estimating the expected power performance of the monitored wind turbine, based on the locally measured wind speeds at the reference wind turbines. Furthermore, since the transfer function is generated while the wind turbines are operated in a normal manner, and based on data obtained during the training period, the transfer function reflects an actual relationship between the measured wind speeds at the reference wind turbines, and the corresponding measured power performance of the monitored wind turbine, during the training period, i.e. before any degradation of the power performance of the monitored wind turbine may be expected.

Next, the wind turbines of the wind farm are again operated, in a normal manner, while obtaining locally measured wind speeds, at least at the reference wind turbines, during one or more test periods, following the training period. Furthermore, locally measured wind speeds may also be obtained at wind turbines which are monitored wind turbines, but which do not form part of a group of reference wind turbines of any of the other monitored wind turbines, and/or at wind turbines which are neither monitored wind turbines, nor reference wind turbines.

The time following the training period may constitute a single test period, or it may be divided into two or more subsequent test periods.

During the test period(s), power performance data is further obtained for each of the monitored wind turbines.

Next, for each of the monitored wind turbines, the power performance data obtained during the test period(s) is compared to predicted power performance data obtained by means of the locally measured wind speeds at the corresponding reference wind turbines during the test period(s) and the previously generated transfer function for the monitored wind turbine.

As described above, the transfer function for a given monitored wind turbine establishes a relationship between the locally measured wind speeds at the reference wind turbines and the power performance of the monitored wind turbine, and it was generated during the training period, i.e. during a period where the monitored wind turbine is expected to operate properly, and with a non-degraded power performance. Accordingly, the predicted power performance data represents the expected power performance of the monitored wind turbine, at the prevailing wind speeds, when the monitored wind turbine performs as it is supposed to. Therefore, comparing the actual power performance data of the monitored wind turbine to the predicted power performance data can reveal whether or not the monitored wind turbine is performing as expected.

Thus, power performance changes for each of the monitored wind turbines are finally assessed, based on the comparison. In particular, it may be determined that the power performance of a monitored wind turbine is degraded, in the case that the comparison reveals that the power performance of this wind turbine is lower than expected. Subsequently, actions may be taken in order to remove the cause of the power performance degradation, thereby once again restoring the power performance of the wind turbine.

Accordingly, the method of the invention allows power degradation of a monitored wind turbine to be quickly and reliably detected, because the predicted power performance data, obtained based on the transfer function which was generated during the training period, provides a reliable baseline for the power performance of the monitored wind turbine. Thereby even gradual changes or small changes in the power performance of a wind turbine can be detected and reacted upon, thereby preventing that the monitored wind turbine is operated at sub-optimal power performance for a long period of time. Furthermore, the method of the invention allows real changes in power performance to be distinguished from changes in power production which are due to other circumstances, such as changes in wind conditions, weather conditions, seasonal changes, etc.

It is further an advantage that the transfer functions for each of the monitored wind turbines are generated based on locally measured wind speeds at the reference wind turbines, because this allows separate measurement stations, e.g. in the form of metmasts, for providing reference wind speed data to be avoided. Furthermore, since the transfer function relies on measured wind speeds from a plurality of measurement devices, reliable measurements can be obtained, even if one or more of the measurement devices malfunctions or is unavailable. Finally, a statistically reliable result is obtained.

Furthermore, when the predicted power performance data for the monitored wind turbine is obtained, using the transfer function, it is obtained within one or more wind speed intervals, based on estimated wind speeds obtained by means of locally measured wind speeds at the reference wind turbines and the generated wind speed transfer function. Thus, according to this embodiment, with regard to the predicted power performance data of the monitored wind turbine, locally measured wind speeds are not relied on. Instead, estimated values of the local wind speed, based on the wind speed transfer function and the measured wind speeds at the reference wind turbines, are relied upon for providing the wind speeds required for the power performance data. Thereby any changes in conditions which affect only wind speed measurements, or which affect wind speed measurements as well as power performance data for the monitored wind turbine, will not be taken into account when assessing power performance changes of a monitored wind turbine. This will allow real changes in power performance of the monitored wind turbine to be distinguishable from changes which are caused by such changes in conditions.

The step of comparing power performance data may comprise comparing power performance data within two or more predefined wind speed intervals. The power performance of a wind turbine may vary significantly from one wind speed interval to another. Therefore, comparing power performance data within two or more predefined wind speed intervals provides a more precise result, allowing real changes in power performance to be detected quickly and reliably, even if the changes are small, and even if the changes only occur at specific wind speeds.

The step of comparing power performance data may comprise comparing power performance data within two or more predefined wind direction intervals. The performance of a wind turbine may vary significantly, depending on the direction of the wind, e.g. due to wind wake effects, variations in the landscape, etc. It may therefore be advantageous to take the direction of the wind into account when comparing the power performance data.

For instance, the transfer function may be generated within two or more predefined wind direction intervals.

The method may further comprise the step of determining a point in time at which a change in power performance of at least one monitored wind turbine occurred. This is in particular relevant in the case that the change in power performance occurred in an abrupt manner.

Determining the point in time at which a change in power performance occurred may be useful when it is attempted to establish the cause of the change in power performance. Knowing the specific point in time will allow the range of possible events or actions causing the change in power performance to be narrowed down to events taking place at the time of the change in power performance, or immediately before.

The point in time at which a change in power performance of at least one monitored wind turbine occurred may, e.g., be determined by comparing power performance data for the monitored wind turbine(s) obtained during a number of subsequent test periods. Thereby it can be determined at which test period the change occurred. The power performance data being compared may, e.g., be a difference between the predicted power performance data and the measure power performance data for each test period. This will allow changes in power performance to be more clearly distinguishable from fluctuations and background noise.

The method may further comprise the step of comparing assessed power performance changes of at least two monitored wind turbines. Such a comparison may, e.g., reveal that a change in power performance has occurred in two or more monitored wind turbines, possibly substantially simultaneously. This may lead to the conclusion that the change in power performance was due to circumstances or one or more events which affected all of these monitored wind turbines. For instance, it may turn out that wind turbines which have been subjected to some kind of hardware or software upgrade experience a change in power performance, while wind turbines which have not been subjected to the upgrade are not experiencing a change in power performance. Thereby it may be concluded that the upgrade caused the change in power performance.

Furthermore, comparing assessed power performance changes among monitored wind turbines may also reveal that a change in power performance is isolated to a single monitored wind turbine. In this case it may be concluded that the change in power performance was caused by something which only affects that wind turbine, e.g. damaged or malfunctioning parts or sensors, fouling of wind turbine blades, etc.

The step of generating a transfer function may comprise training a learning algorithm. According to this embodiment the transfer functions for the respective monitored wind turbines are generated gradually, during the training period, and the transfer functions are obtained on the basis of empirical wind speed data and power performance data, collected during a time period which is sufficiently long to provide a statistically reliable foundation for estimating power performance data at the monitored wind turbines, based on the locally measured wind speeds at the reference wind turbines.

Alternatively or additionally, the step of generating a transfer function may be performed using a linear regression method.

The object of the transfer function for a given monitored wind turbine is to be able to estimate or predict power performance data for the monitored wind turbine, based on locally measured wind speeds at the reference wind turbines of the group of reference turbine for that monitored wind turbine. The transfer function for the I'th monitored wind turbine may advantageously be of the form:

$$\hat{v} = f_i(X_R),$$

where $\hat{v}$ denotes the predicted power performance data, $f_i$ is a predictor function for the i'th monitored wind turbine, and $x_R$ represents the reference wind speed data obtained from the reference wind turbines. Assuming that there are $n_R$ reference wind turbines, a linear regression of power performance data on reference wind speeds, obtaining $n_R$ fitted linear regression functions may, e.g., be created. A power performance data score may then be synthesized as the average of the predicted values:

$$\hat{v}_i = \frac{1}{n_R} \Sigma_{j \in R}(a_{ij} + b_{ij} v_{ij}),$$

where $a_{ij} + b_{ij} v_{ij}$ denotes the j'th reference prediction.

As an alternative, multiple regression of the power performance data, using all reference wind turbine wind speeds as regressors, may be used.

Alternatively or additionally, the step of assessing power performance change may comprise comparing power curves obtained during the training period and during one or more test periods.

Substantially all of the wind turbines of the wind farm may be monitored wind turbines. According to this embodiment, the power performance of substantially all of the wind turbines of the wind farm may be assessed, using the method of the invention. However, some of the wind turbines of the wind farm may be omitted.

The group of reference wind turbines for a given monitored wind turbine may include substantially all of the wind turbines of the wind farm, except the monitored wind turbine. According to this embodiment, a given monitored wind turbine will have all, or almost all, of the other wind turbines of the wind farm as reference wind turbines. This provides a statistically reliable result. Furthermore, if substantially all of the wind turbines of the wind farm are also monitored wind turbines, a given wind turbine will be a reference wind turbine for substantially all of the other wind turbines of the wind farm.

As an alternative, a smaller group of reference wind turbines may be selected for a given monitored wind turbine, e.g. only wind turbines arranged in the vicinity of the monitored wind turbine, or only wind turbines of the same type as the monitored wind turbine, etc.

The predicted power performance data obtained by means of the locally measured wind speeds at the corresponding reference wind turbines during the test period(s) and the previously generated transfer function for the monitored wind turbine, may be obtained using a synthesis function reducing the prediction for each reference wind turbine to a monitored wind turbine to one prediction. The synthesis function could, e.g., include a simple average, median, geometric mean or another simple aggregator.

Thus, the synthesis function may include an average or a weighted average per wind speed interval. In the case that the synthesis function includes a weighted average, the weights could, e.g., be calculated or selected based on the distances between each of the reference wind turbines and the monitored wind turbine in question. For instance, the weights could be (1/distance) or (1/distance*the uncertainty of the transfer function). Thereby the wind speed measurements from the reference wind turbines which are arranged close to the monitored wind turbine in question are given more weight than the wind speed measurements from the reference wind turbines which are arranged far from the monitored wind turbine. However, a simple average may instead be used, or the weights may be calculated or selected in another manner, e.g. taking specific conditions at the site, such as wind wake, expected turbulence, expected wind shear, hills and valleys, etc., into account.

For instance, the synthesis function may include Kriging as a method of interpolation. In this case a surface is fitted to the wind speed data, and an interpolation to the location of interest, i.e. the location of the monitored wind turbine, is performed. Ordinary Kriging is basically a weighted average over spatially distributed data, where the weights are estimated by spatial correlation. Universal Kriging assumes a polynomial surface instead of the average and thin plate splines versions also exist. The synthesis method may, alternatively, be in the form of a regression learning algorithm or a spatio-temporal dynamical model.

BRIEF DESCRIPTION OF THE DRAWINGS

The invention will now be described in further detail with reference to the accompanying drawings in which.

DETAILED DESCRIPTION OF THE DRAWINGS

Figure 1B:
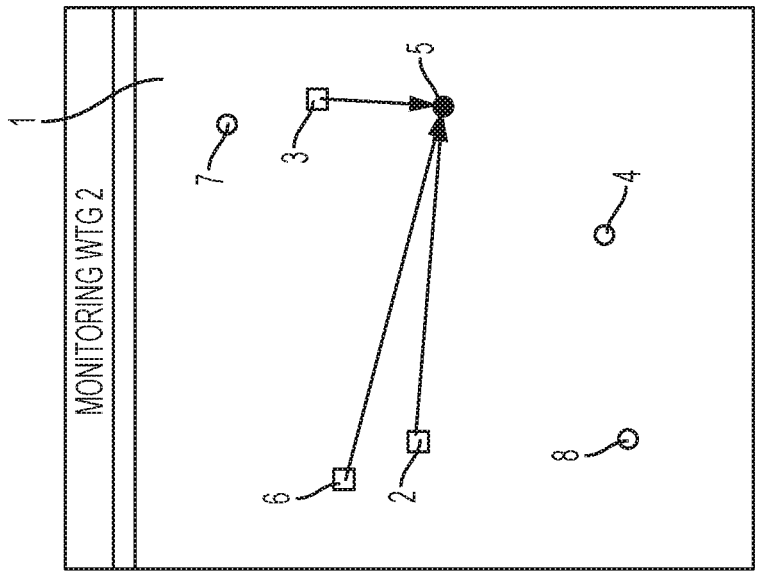
FIGS. 1a and 1b show a layout of a wind farm, illustrating groups of reference wind turbines for two different monitored wind turbines.
Figure 1A:
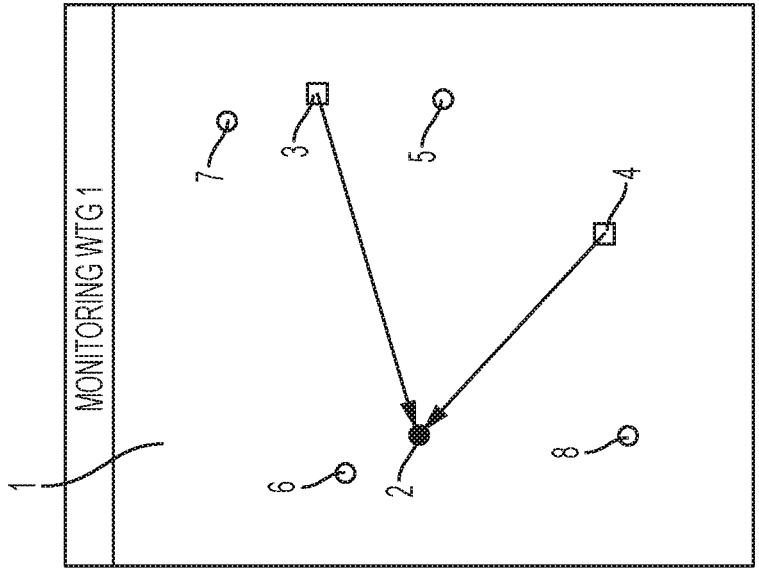

FIGS. 1a and 1b show a layout of a wind farm 1 comprising a number of wind turbines, seven of which are shown. Potentially, each of the wind turbines of the wind farm 1 may be a monitored wind turbine, and any of the wind turbines of the wind farm 1 may form part of a group of reference wind turbines for one or more of the other wind turbines of the wind farm 1.

In FIG. 1a, wind turbine 2 is illustrated as a monitored wind turbine, and wind turbines 3 and 4 are illustrated as reference wind turbines for the monitored wind turbine 2. Wind turbines 5, 6, 7 and 8 do not form part of the group of reference wind turbines for the monitored wind turbine 2, and these wind turbines 5, 6, 7, 8 are therefore labelled as 'not used' in FIG. 1a.

In FIG. 1b, wind turbine 5 is illustrated as a monitored wind turbine, and wind turbines 2, 3 and 6 are illustrated as reference wind turbines for the monitored wind turbine 5. Wind turbines 4, 7 and 8 do not form part of the group of reference wind turbines for the monitored wind turbine 5, and these wind turbines 4, 7, 8 are therefore labelled as 'not used' in FIG. 1b.

Thus, wind turbine 2 is a monitored wind turbine, but is also a reference wind turbine with respect to wind turbine 5. Wind turbine 3 is a reference wind turbine with respect to wind turbine 2 as well as with respect to wind turbine 5. Wind turbines 7 and 8 are neither illustrated as monitored wind turbines, nor as reference wind turbines. This could, e.g., be because specific circumstances regarding wind turbines 7 and 8 make them unsuitable for use as monitored wind turbines as well as for use as reference wind turbines. For instance, special wind or terrain condition may be present in the parts of the wind farm 1 where these wind turbines 7, 8 are located. Or they may be of a different type than the other wind turbines of the wind farm 1.

When the groups of reference wind turbines have been defined for each of the wind turbines to be monitored, a training period is initiated, in which the wind turbines 2, 3, 4, 5, 6, 7, 8 of the wind farm 1 are operated in a normal manner. During the training period, locally measured wind speeds are obtained at each of the wind turbines 2, 3, 4, 5, 6, 7, 8. Furthermore, power performance data is obtained from each of the monitored wind turbines.

Then, also during the training period, a transfer function is generated for each of the monitored wind turbines. The transfer function for a given monitored wind turbine establishes a relationship between locally measured wind speeds at each of the reference wind turbines and the power performance data for the monitored wind turbine, based on the locally measured wind speeds and power performance data obtained during the training period.

Thus, the transfer function for wind turbine 2 establishes a relationship between the locally measured wind speeds at wind turbines 3 and 4 and the power performance data for wind turbine 2. Similarly, the transfer function for wind turbine 5 establishes a relationship between the locally measured wind speeds at wind turbines 2, 3 and 6 and the power performance data for wind turbine 5.

Following the training period, the wind turbines 2, 3, 4, 5, 6, 7, 8 are once again operated in a normal manner, during one or more test periods. During the test period(s), locally measured wind speeds are obtained, at least at the reference wind turbines, and power performance data is obtained for each of the monitored wind turbines.

Finally, for each monitored wind turbine, the power performance data obtained during the test period(s) is compared to predicted power performance data. The predicted power performance data for a given monitored wind turbine is obtained by means of the locally measured wind speeds at the corresponding reference wind turbines during the test period(s) and the previously generated transfer function for the monitored wind turbine. Thus, the predicted power performance data represents an expected power performance for the monitored wind turbine, under the given wind conditions. Accordingly, the comparison reveals whether or not the monitored wind turbines perform in an expected manner. Accordingly, the power performance for each of the monitored wind turbines is assessed, based on the comparison.

Figure 2:
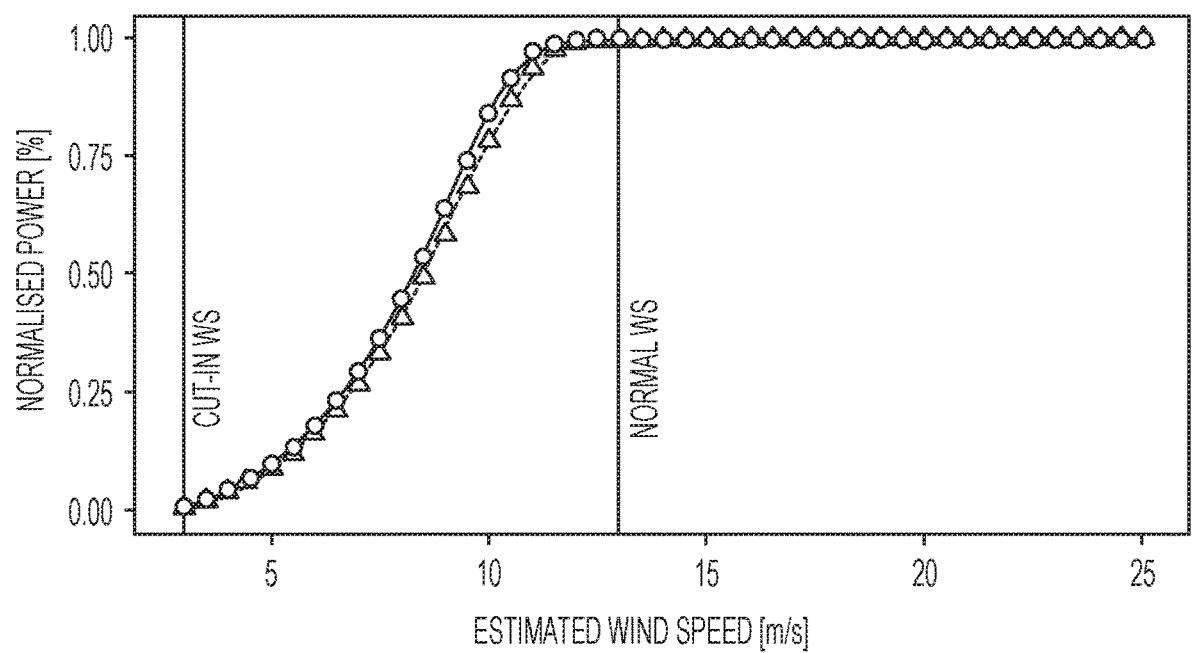
FIG. 2 shows predicted and measured power curves, respectively, for a monitored wind turbine.

FIG. 2 shows predicted (triangles) and measured power curves (circles), respectively, for a monitored wind turbine. More particularly, the curves of FIG. 2 illustrate normalised power output of the monitored wind turbines as a function of wind speed.

The curve marked with circles represents predicted power performance data, and is generated on the basis of measured wind speed data at the reference wind turbines corresponding to the monitored wind turbine, obtained during one or more test periods, and on the basis of a transfer function for the monitored wind turbine, which was generated during a previous training period. Accordingly, this curve is a representation of expected power performance of the monitored wind turbine.

The curve marked with triangles is generated on the basis of measured power performance data for the monitored wind turbine, obtained during the one or more test periods. Accordingly, comparing the two curves readily reveals whether or not the monitored wind turbine is performing as expected.

From FIG. 2 it appears that, in the partial load region, i.e. in the wind speed region between a cut-in wind speed and a nominal wind speed, i.e. a wind speed corresponding to nominal output power, the normalised measured power output of the monitored wind turbine is lower than the normalised predicted power output of the monitored wind turbine. Accordingly, comparing the two curves reveals that the power performance of the monitored wind turbine is lower than expected, i.e. the power performance of the monitored wind turbine is, for some reason, degraded.

In order to assess the power performance over time the integral of the power curve from cut-in wind speed to nominal wind speed can be used. The value of the integral represents the power performance, for both predicted and measured power performance, which is then monitored over consecutively time intervals.

Figure 3:
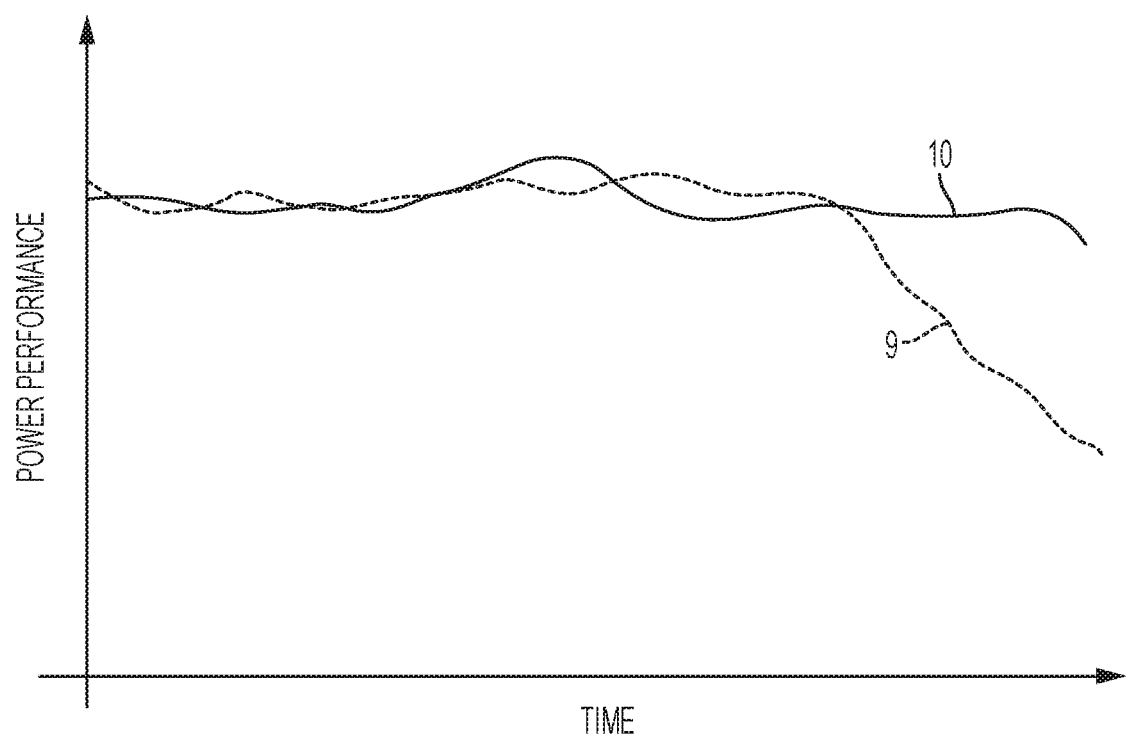
FIG. 3 is a graph showing difference between predicted annual energy production and measured annual energy production obtained during a sequence of test periods, for one of the number of monitored wind turbines.

FIG. 3 is a graph showing rolling average values of the predicted power performance (graph 10) and rolling average values of the measured power performance (graph 9) for a monitored wind turbine, obtained during a sequence of sequential test periods. The predicted power performance 10 for a wind turbine is obtained on the basis of locally measured wind speeds at the corresponding reference wind turbine, obtained during the test periods, and on the basis of a transfer function for the monitored wind turbine, obtained during a training period, as described above.

It can be seen that, initially the measured power performance is substantially identical to the predicted power performance. However, a significant decrease in measured power performance compared to the predicted power performance occurs at the end of one of the test periods. Accordingly, from the graph it can be established that this particular wind turbine is operating at degraded power performance, and the point in time at which the degradation started can be established. The specific degraded power performance of the monitored wind turbine as seen in FIG. 3 can, for example, be caused by a failure in the pitch system in one of the blades of the monitored wind turbine.

The invention claimed is:

1. A method for monitoring and assessing power performance changes of one or more wind turbines of a wind farm, the method comprising:
    for each wind turbine to be monitored, defining a group of reference wind turbines, the group of reference wind turbines comprising two or more wind turbines;
    operating the wind turbines of the wind farm, while obtaining locally measured wind speeds at each of the wind turbines, during a training period;
    obtaining power performance data for each of the monitored wind turbines, during the training period;
    for each of the monitored wind turbines, generating a transfer function establishing a relationship between the locally measured wind speeds at each of the reference wind turbines and the power performance data for the monitored wind turbine, based on locally measured wind speeds and power performance data obtained during the training period;
    operating the wind turbines of the wind farm, while obtaining locally measured wind speeds, at least at the reference wind turbines during a one or more test period, following the training period;
    obtaining power performance data for each of the monitored wind turbines, during the test period;
    for each of the monitored wind turbines, comparing the power performance data obtained during the test period to predicted power performance data obtained by means of the locally measured wind speeds at the corresponding reference wind turbines during the test period and the previously generated transfer function for the monitored wind turbine; and
    assessing power performance changes for each of the monitored wind turbines, based on the comparison.

2. A method according to claim 1, wherein the step of generating a transfer function comprises generating a wind speed transfer function establishing a relationship between the locally measured wind speed at the monitored wind turbine and the locally measured wind speeds at each of the corresponding reference wind turbines; and
    wherein the predicted power performance data is obtained within one or more wind speed intervals, based on estimated wind speeds obtained by means of locally measured wind speeds at the reference wind turbines and the generated wind speed transfer function.

3. A method according to claim 1, wherein the step of comparing power performance data comprises comparing power performance data within two or more predefined wind speed intervals.

4. A method according to claim 1, wherein the step of comparing power performance data comprises comparing power performance data within two or more predefined wind direction intervals.

5. A method according to claim 1, further comprising the step of determining a point in time at which a change in power performance of at least one monitored wind turbine occurred.

6. A method according to claim 1, further comprising the step of comparing assessed power performance changes of at least two monitored wind turbines.

7. A method according to claim 1, wherein the step of generating a transfer function comprises training a learning algorithm.

8. A method according to claim 1, wherein the step of generating a transfer function is performed using a linear regression method.

9. A method according to claim 1, wherein all of the wind turbines of the wind farm are monitored wind turbines.

10. A method according to claim 1, wherein the group of reference wind turbines for a given monitored wind turbine includes all of the wind turbines of the wind farm, except the given monitored wind turbine.

11. A method according to claim 1, wherein the predicted power performance data obtained by means of the locally measured wind speeds at the corresponding reference wind turbines during the test period and the previously generated transfer function for the monitored wind turbine, are obtained using a synthesis function reducing the prediction for each reference wind turbine to a monitored wind turbine to one prediction.

12. A program product comprising a computer readable medium containing instructions which, when executed by a processor, performs an operation for monitoring and assessing power performance changes of one or more wind turbines of a wind farm, wherein for each wind turbine to be monitored, a group of reference wind turbines is defined, the group of reference wind turbines comprising two or more wind turbines, the operation comprising:
- obtaining locally measured wind speeds at each of the wind turbines while operating the wind turbines during a training period;
- obtaining power performance data for each of the monitored wind turbines, during the training period;
- for each of the monitored wind turbines, generating a transfer function establishing a relationship between the locally measured wind speeds at each of the reference wind turbines and the power performance data for the monitored wind turbines, based on locally measured wind speeds and power performance data obtained during the training period;
- while operating the wind turbines of the wind farm, obtaining locally measured wind speeds at least at the reference wind turbines during a test period, following the training period;
- obtaining power performance data for each of the monitored wind turbines, during the test period;
- for each of the monitored wind turbines, comparing the power performance data obtained during the test period to predicted power performance data obtained by means of the locally measured wind speeds at the corresponding reference wind turbines during the test period and the previously generated transfer function for the monitored wind turbine; and
- assessing power performance changes for each of the monitored wind turbines, based on the comparison.

13. The program product of claim 12, wherein generating a transfer function comprises generating a wind speed transfer function establishing a relationship between the locally measured wind speed at the monitored wind turbine and the locally measured wind speeds at each of the corresponding reference wind turbines; and
- wherein the predicted power performance data is obtained within one or more wind speed intervals, based on estimated wind speeds obtained by means of locally measured wind speeds at the reference wind turbines and the generated wind speed transfer function.

14. The program product of claim 12, wherein comparing power performance data comprises comparing power performance data within two or more predefined wind speed intervals.

15. The program product of claim 12, wherein comparing power performance data comprises comparing power performance data within two or more predefined wind direction intervals.

16. The program product of claim 12, further comprising determining a point in time at which a change in power performance of at least one monitored wind turbine occurred.

17. The program product of claim 12, further comprising comparing assessed power performance changes of at least two monitored wind turbines.

18. The program product of claim 12, wherein generating a transfer function comprises training a learning algorithm.

19. The program product of claim 12, wherein generating a transfer function is performed using a linear regression method.

* * * * *